United States Patent
Jeong et al.

(10) Patent No.: US 8,332,573 B2
(45) Date of Patent: Dec. 11, 2012

(54) METHOD AND APPARATUS FOR PERFORMING ADDRESS MAPPING IN VIRTUAL FILE SYSTEM OF STORAGE UNIT HAVING A PLURALITY OF NON-VOLATILE DATA STORAGE MEDIA

(75) Inventors: Seong-hun Jeong, Suwon-si (KR); Houng-sog Min, Ansan-si (KR); Dong-woo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 474 days.

(21) Appl. No.: 12/045,168

(22) Filed: Mar. 10, 2008

(65) Prior Publication Data
US 2009/0070547 A1  Mar. 12, 2009

(30) Foreign Application Priority Data
Sep. 11, 2007 (KR) .................. 10-2007-0092045

(51) Int. Cl.
G06F 12/02 (2006.01)
G06F 12/06 (2006.01)
(52) U.S. Cl. .................. 711/103; 711/114; 711/206
(58) Field of Classification Search .................. 711/202, 711/103, 114, 206
See application file for complete search history.

(56) References Cited

U.S. PATENT DOCUMENTS

| 7,529,905 B2 * | 5/2009 | Sinclair .................. 711/170 |
| 2005/0144516 A1 * | 6/2005 | Gonzalez et al. .................. 714/8 |
| 2005/0166087 A1 * | 7/2005 | Gorobets .................. 714/7 |

FOREIGN PATENT DOCUMENTS

| KR | 10-2006-0087958 A | 8/2006 |
| WO | 2006028283 A1 | 3/2006 |

* cited by examiner

Primary Examiner — Kalpit Parikh
(74) Attorney, Agent, or Firm — Sughrue Mion, PLLC

(57) ABSTRACT

Provided are a method and apparatus capable of reducing a metadata processing time associated with address mapping performed to input/output burst data at a high speed in a virtual file system of a storage unit having a plurality of non-volatile data storage media. The method includes: determining a block group including a block included in each of a plurality of the non-volatile data storage media; determining an access unit including each page included in the determined block group; and mapping an address of input/output data to the determined block group and the access unit. Therefore, it is possible to significantly reduce an address mapping processing time in the virtual file system that may function as a bottleneck in high-speed input/output in a large-capacity storage unit.

21 Claims, 9 Drawing Sheets

METHOD AND APPARATUS FOR PERFORMING ADDRESS MAPPING IN VIRTUAL FILE SYSTEM OF STORAGE UNIT HAVING A PLURALITY OF NON-VOLATILE DATA STORAGE MEDIA

CROSS-REFERENCE TO RELATED PATENT APPLICATION

This application claims priority from Korean Patent Application No. 10-2007-0092045, filed on Sep. 11, 2007, in the Korean Intellectual Property Office, the disclosure of which is incorporated herein in its entirety by reference.

BACKGROUND OF THE INVENTION

1. Field of the Invention

Methods and apparatus consistent with the present invention relate to performing address mapping in a virtual file system of a storage unit having a plurality of non-volatile data storage media, and more particularly, to reducing a metadata processing time associated with address mapping performed in a virtual file system, so as to input/output burst data at a high speed.

2. Description of the Related Art

In general, multimedia devices such as mobile devices store and provide large-size multimedia data such as MP3 music and video to users. A storage unit used in the multimedia devices provides a large-capacity storage space, and is one in which data can be read from and written to at a high speed.

A flash memory, which is a non-volatile data storage unit, has been widely used as the storage unit of mobile devices due to its low power, miniaturization, low heat generation, high stability, and the like. In addition, as the density of the flash memory has rapidly increased and the demand by users for a large capacity memory increases, a capacity that can be stored in a single memory has rapidly increased.

FIG. 1 is a function block diagram for explaining a related art address mapping method used in a single flash memory chip.

A host device 110 transmits a logical address in units of 512 bytes to a flash memory device 120 to request the flash memory device 120 to input/output data. Since a data structure of a file system used by the host device 110 and a data structure used by the flash memory device 120 to read and write data are different from each other, the flash memory device 120 includes a flash translation layer (FTL) 121 as a virtual file system to translate the logical address transmitted from the host device 110 to a physical address, which is an address used to practically read and write data. After the logical address is mapped to the physical address by the FTL 121, map table data and user data 123-3 may be written to or read from a flash memory 123 through a memory controller 122. The map table includes the block map table 123-1, for mapping data in units of blocks, and the page map table 123-2, for mapping data in units of 64 pages in each block. In general, the block map table 123-1 is stored in a metadata block in the flash memory 123, and the page map table 123-2 is stored in a spare area in a user data block.

The address mapping operation of translating the logical address to the physical address in order to write and erase data to and from the storage unit as illustrated in FIG. 1 is applied to non-volatile data storage units in addition to the flash memory 123, so that a description provided later is also applicable to non-volatile data storage units.

FIG. 2 is a view illustrating an N-channel/4-way hardware architecture using a flash memory, according to related art.

Generally a flash memory has a slow write speed. Therefore, in order for the memory controller to perform high-speed data input/output and not waste time waiting in a standby mode, various hardware architectures included in the flash memory storage unit have been proposed.

Referring to FIG. 2, a flash memory controller 210 and 4 flash memories per channel are illustrated. A general flash memory storage unit uses a number of flash memory chips as illustrated in order to increase a storage capacity and improve a data input/output performance. In a first channel 220, 4 flash memories 221 to 224 are connected via a system bus to apply interleaving in order to minimize a wait time of the flash memory controller 210 when a write operation, that is, programming is performed on the flash memories 221 to 224.

The write operation performed on the flash memory includes: i) loading data to be written into a page buffer included in the flash memory; and ii) writing the data loaded into the page buffer in a cell array of the flash memory. In order to perform the two steps at a high speed, the general flash memory storage unit connects a number of the flash memory chips in a single channel in order for the memory chips to be controlled by the flash memory controller 210 to input/output data in an interleaving technique. According to a general flash memory standard, when a single channel uses 4 or 5 flash memory chips, further performance improvement cannot be expected. Therefore, the 4-way architecture in which address distribution can be easily performed to the exponent of 2 is mainly used.

The read and the write operations are performed on the flash memory generally in units of pages, and an erase operation is performed in units of blocks including a number of pages in order to perform the write operation again for updating. This characteristic is different from that of a general storage unit, and for compatibility with an existing file system, the aforementioned FTL 121, which is software (virtual file system), is used to manage the general flash memory storage unit and provide compatibility with the existing file system. The virtual file system, for the compatibility with the file system, can be applied to other non-volatile data storage units.

Due to technical development, the data input/output processing speed of a large-capacity flash memory storage unit is increased to a substantially theoretical maximum speed in hardware. However, an algorithm for faster data input/output processing in terms of software is still required.

Specifically, in the aforementioned hardware architecture structure, the FTL 121 transmits various commands to each flash memory in response to a read/write request from the file system. When it is assumed that a storage unit using a single flash memory chip is used as illustrated in FIG. 1, commands transmitted from the FTL 121 to the hardware in response to the data write request of the host device 110 include metadata commands such as map table read/update, block erase, block merge, and the like and data commands for inputting/outputting practically requested user data. The FTL operations are associated with address mapping for translating a logical address to a physical address in order to read, write, and erase user data.

When the above-mentioned method is applied to a flash memory storage unit using a number of chips for high-speed data input/output as illustrated in FIG. 2, a plurality of pieces of independent metadata exist in units of flash memory chip devices or channels. Therefore, in this structure, based on the data input/output request of the file system, the FTL 121 transmits a different command to each of the metadata.

Accordingly, each of the independent FTL metadata has a different metadata command set and therefore has a different execution time.

As the units of the commands managed by the FTL 121 increase, complexity associated with the address mapping in the FTL 121 increases. Due to the increase in the complexity of the FTL 121, a code size of the FTL 121 also increases, memory usage increases, and a processing time of the CPU increases. Consequently, resource usage increases. The increase in the throughput of the FTL 121 results in occurrence of a delay time for each command issue. In addition, the user data input/output commands are concentrated at a specific point in time, so that burst data transmission between the host and the storage unit cannot be easily performed, and this may degrade a performance improvement effect caused by interleaving. Accordingly, a part for processing the address mapping of the FTL 121 in the entire system may function as a bottleneck. Therefore, a new algorithm, in terms of software, for decreasing a time to process the address mapping is required.

SUMMARY OF THE INVENTION

The present invention provides a method and apparatus for performing address mapping in a virtual file system of a storage unit having a plurality of non-volatile data storage media capable of reducing a metadata processing time associated with the address mapping, so as to input/output burst data at a high speed.

According to an aspect of the present invention, there is provided an address mapping method performed in a virtual file system of a storage unit having a plurality of non-volatile data storage media, the method including: determining a block group including a block included in each of a plurality of the non-volatile data storage media; determining an access unit including each page included in the determined block group; and mapping an address of input/output data to the determined block group and access unit.

The block group may include a plurality of blocks having the same block number from among a plurality of blocks included in each of a plurality of the non-volatile data storage media, and the access unit may include a plurality of pages having the same offset in the block group.

Determining the block group may include storing a block group map table representing relationships between the block group and a plurality of the blocks included in the block group.

The block group map table may include the block group number and one or more of the block numbers corresponding to the block group.

Determining the access unit may include storing an access unit map table representing relationships between the access unit and a plurality of the pages included in the access unit.

The access unit map table may include block offsets used to distinguish the block numbers included in the block group map table and page offsets used to distinguish a plurality of the pages in the block corresponding to the block number.

In storing the block group map table, a predetermined block group from among the block groups may be selected to store the block group map table in a corresponding block group, and in storing the access unit map table, the access unit map table may be stored in a spare area existing in the access unit in the block group.

The block group may be a unit for erasing the input/output data and a unit for simultaneously transmitting an erase command to a plurality of the blocks from the virtual file system, and the access unit may be a unit for reading/writing the data and a unit for simultaneously transmitting the read/write command to a plurality of the pages.

The plurality of the non-volatile data storage media may be a plurality of flash memories, and the virtual file system may be a flash translation layer.

According to another aspect of the present invention, there is provided an address mapping apparatus in a virtual file system of a storage unit having a plurality of non-volatile data storage media, the apparatus including: a block group processor determining a block group including a block included in each of a plurality of the non-volatile data storage media; an access unit processor determining an access unit including each page included in the determined block group; and a device driver transmitting a data input/output command to the determined block group and access unit.

The block group processor may include a first map table storage storing a block group map table representing relationships between the block group and a plurality of the blocks included in the block group.

The access unit processor may include a second map table storage storing an access unit map table representing relationships between the access unit and a plurality of the pages included in the access unit.

According to another aspects of the present invention, there are provided a computer-readable medium having embodied thereon a computer program for the method above, and a memory device having the apparatus above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, exemplary embodiments of the present invention will be described in detail with reference to the attached drawings. An address mapping operation described according to the exemplary embodiments is applied to a flash memory and also can be applied to a non-volatile data storage unit in addition to the flash memory, so that a description provided later is applicable to any kind of non-volatile data storage unit.

Figure 1:
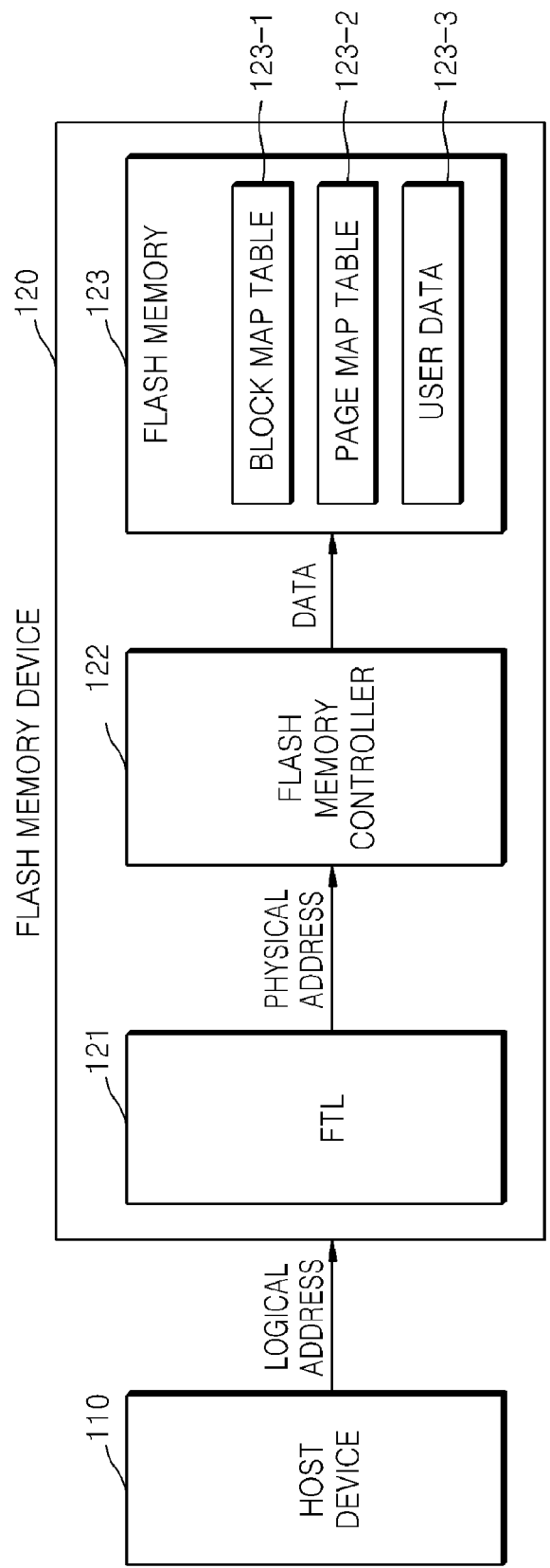
FIG. 1 is a function block diagram for explaining a related art address mapping method used in a single flash memory chip.
Figure 2:
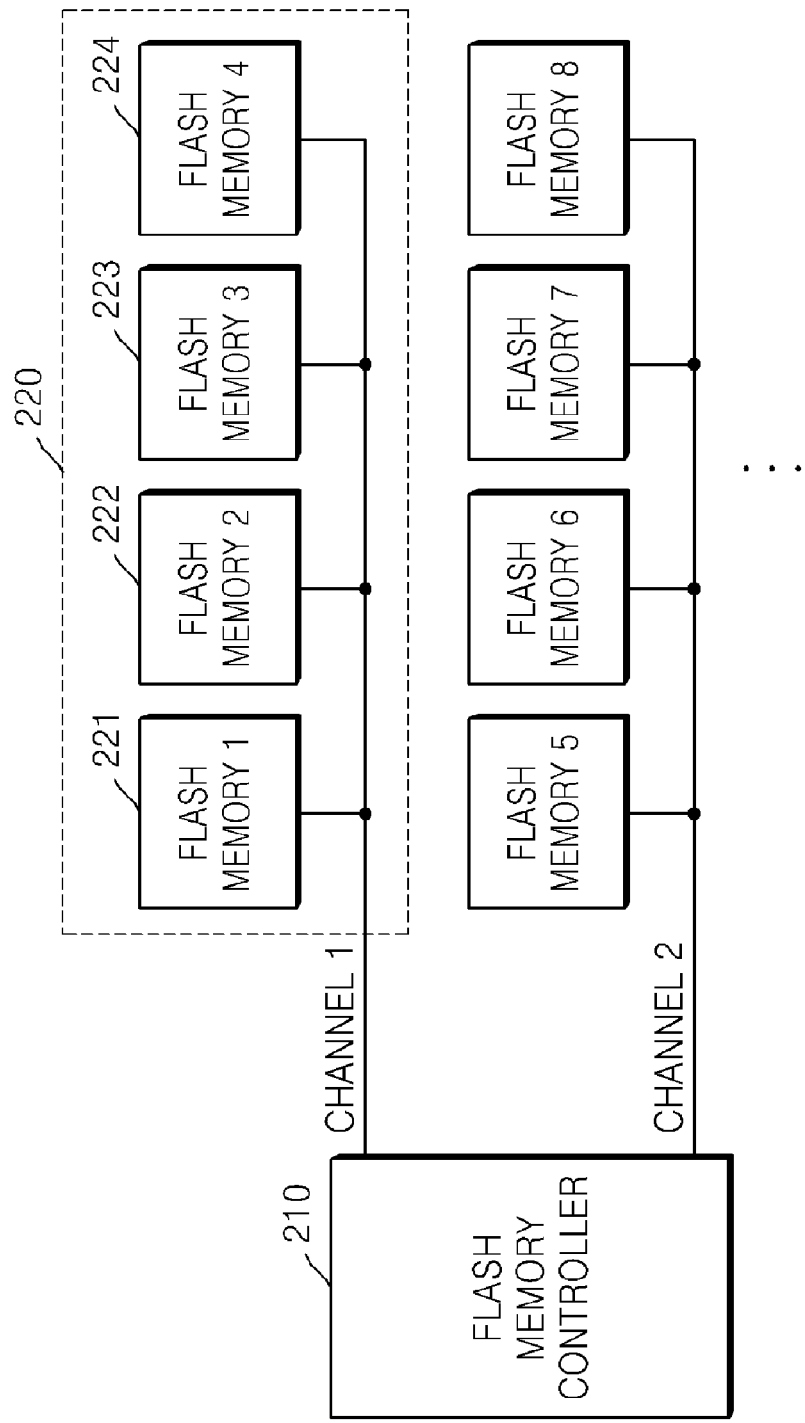
FIG. 2 is a view illustrating an N-channel/4-way hardware architecture using a flash memory, according to related art.
Figure 3:
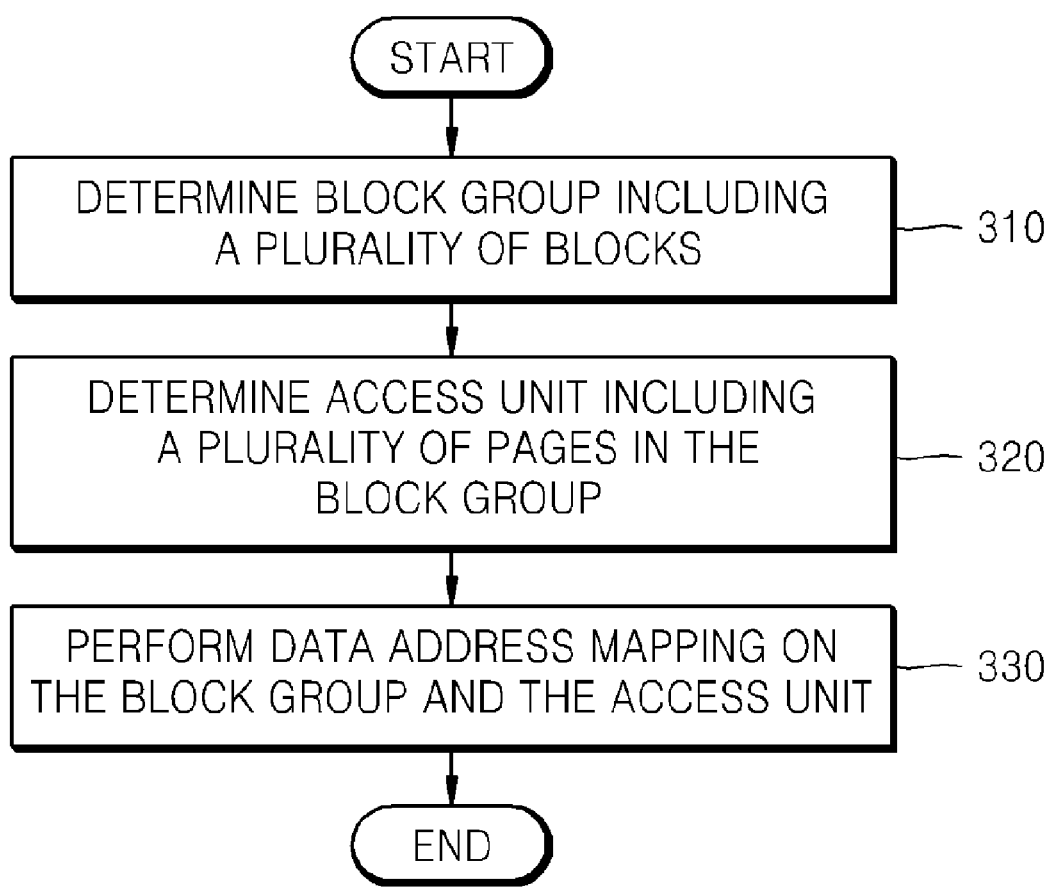
FIG. 3 is a flowchart of a method of performing address mapping in a virtual file system of a storage unit having a plurality of non-volatile data storage media, according to an exemplary embodiment of the present invention.

FIG. 3 is a flowchart of a method of performing address mapping in a virtual file system of a storage unit having a plurality of non-volatile data storage media, according to an embodiment of the present invention.

Referring to FIG. 3, the method of performing address mapping, according to the present embodiment of the present invention, includes: determining a block group including a block included in each of the non-volatile data storage media (operation 310); determining an access unit including each page included in the determined block group (operation 320); and mapping an address of input/output data to the determined block group and the access unit (operation 330).

Unlike an existing method of performing address mapping in units of blocks and pages on each of a plurality of non-volatile storage media such as a flash memory chip, a plurality of blocks are grouped into the block group as a new unit to perform the address mapping.

In addition, the access unit that is a unit for practically writing data in the block group is defined. The access unit includes a plurality of pages included in a plurality of the non-volatile data storage media in each block group.

A data structure of the block group and the access unit is described in detail with reference to FIG. 4.

Figure 4:
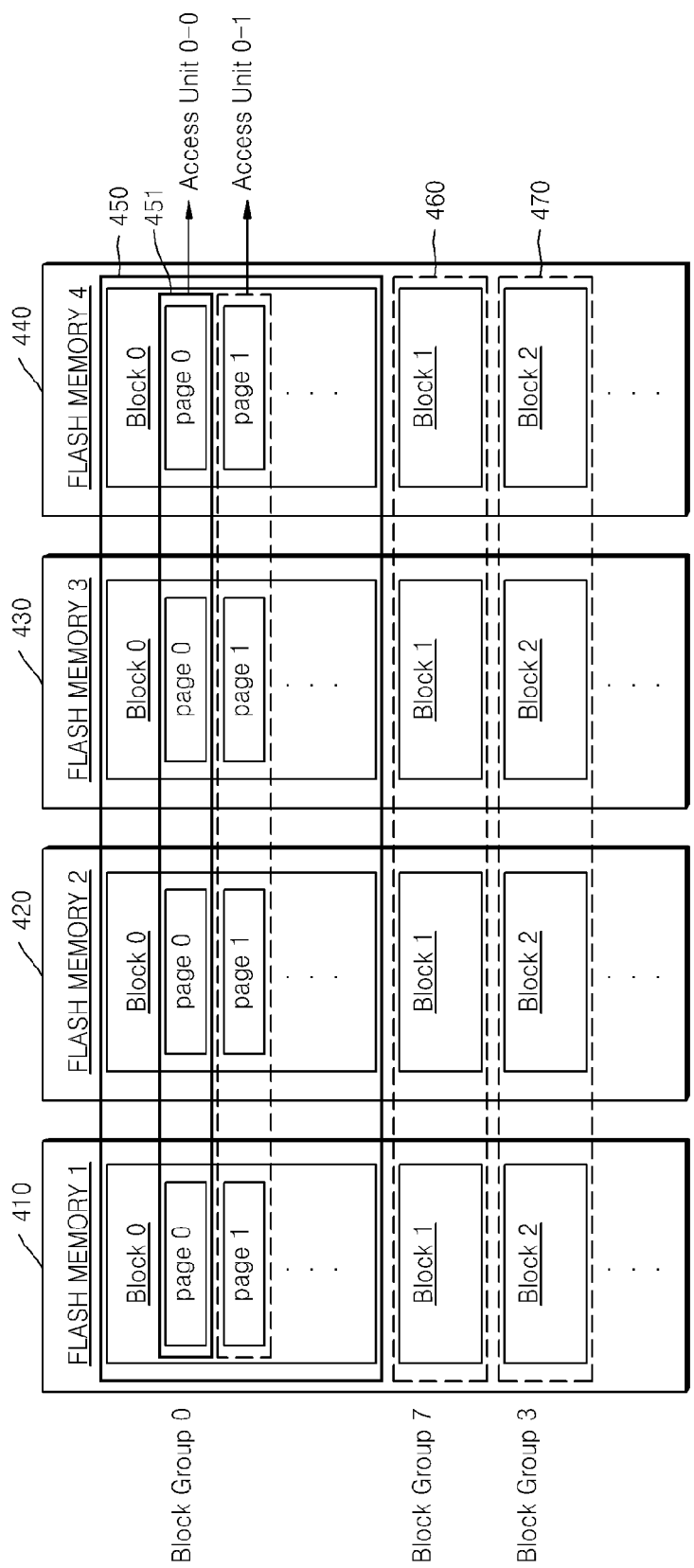
FIG. 4 is a view for explaining a method of determining a block group and an access unit for 4 flash memories, according to an exemplary embodiment of the present invention.

FIG. 4 is a view for explaining a method of determining the block group and the access unit for 4 flash memories, according to an embodiment of the present invention.

Referring to FIG. 4, first to fourth flash memories 410 to 440 are illustrated. Each flash memory includes a plurality of blocks, and each block includes 64 pages as described above.

In a flash translation layer (FTL), according to the current embodiment of the present invention, the first to fourth flash memories 410 to 440 are not independently managed, but are grouped in units of blocks and pages in order for the first to fourth flash memories 410 to 440 to be used.

As illustrated in FIG. 4, blocks 0 in the first to fourth flash memories 410 to 440 are grouped into a single block group, that is, block group 0 450.

In addition, in the block group 0 450, pages 0 in the first to fourth flash memories 410 to 440 are grouped, so as to be defined as an access unit 0-0 451.

Metadata operations managed by the FTL such as map/table read/update, block group erase, block group merge, and the like are performed in units of the block groups and the access units. Therefore, the block group becomes a unit for erasing input/output data and becomes a unit to which an erase command is simultaneously transmitted from the FTL. In addition, the access unit becomes a unit for reading/writing data and becomes a unit to which a read/write command is simultaneously transmitted from the FTL. Therefore, in the flash memory storage unit, the FTL processes the metadata command in units of the block groups and the access units, so that the number of entries decreases as compared with a conventional map table in units of blocks and pages. Accordingly, the number of write/update operations performed on the map table is decreased. In addition, a plurality of flash memories are connected in units of the block groups and the access units so as to simultaneously receive the same command, so that more accurate interleaving can be implemented.

Figure 9:
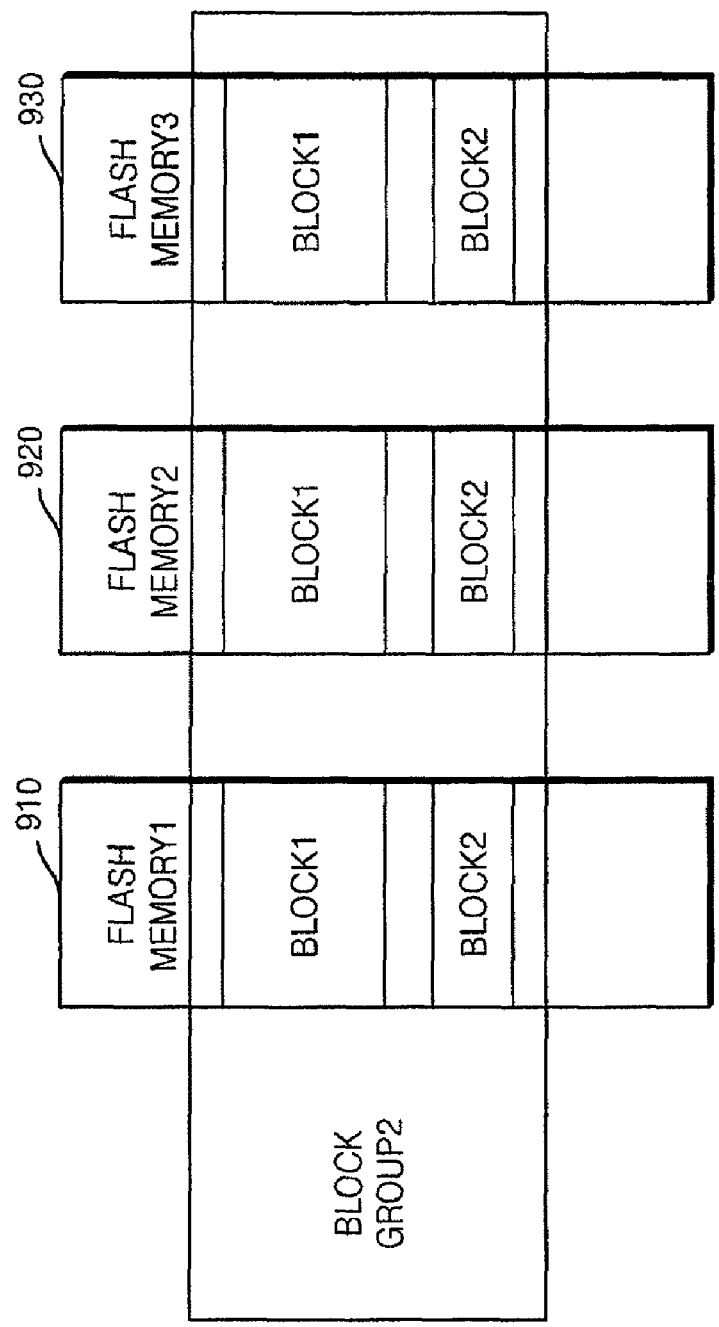
FIG. 9 is a view for explaining a method of determining a block group for 3 flash memories, according to an exemplary embodiment of the present invention.

Also, a single block group does not need to include all flash memories in the storage unit. In addition, a block group number and a block number do not need to be the same. In FIG. 4, 1-th blocks (referred to as block 1) in the first to fourth flash memories 410 to 440 can be grouped into a 7-th block group (referred to as block group 7) 460. However, blocks included in the same block group have the same block number. For example, all blocks in the block group 7 460 are 1-th blocks (referred to as block 1) having the same block number, and all blocks in a 3-th block group (referred to as block group 3) 470 are 2-th blocks (referred to as block 2 having the same block number). As another example, FIG. 9 illustrates three flash memories 910, 920, and 930. The blocks in the block group 2 are not continuous such that first block in the block group 2 may be a third block in the flash memories 910, 920, and 930 and the second block in the block group 2 maybe a fifth block in the flash memories 910, 920, and 930.

The access unit includes pages having the same offset in its block group. For example, the access unit 0-0 451 in the block group 0 450 includes pages having an offset of 0. In this case, the access unit number and the offset of the pages do not need to be the same. For example, the access unit 0-0 451 may include pages having an offset of 3.

Since the unit for erasing and reading/writing data is changed to the block group and the access unit, a construction of the map table has to be modified. Therefore, according to the embodiment of the present invention, a block group map table representing relationships between a block group and a plurality of blocks included in the block group is stored, and an access unit map table representing relationships between an access unit and a plurality of pages included in the access unit is stored and managed.

The block map table stores the block group number and one or more block numbers corresponding to the block group. Referring to FIG. 4, for example, since the block group 0 450 includes blocks having the block number of 0, the block map table may store a relational expression of "block group 0->block number 0". In addition, two or more block numbers can be allocated to a single block group. For example, blocks having the block numbers of 1 and 11 may be allocated to the block group 7 460, and a relational expression "block group 7->block number 1, block number 11" representing relationships therebetween is stored in the block map table. Accordingly, a case where data is input while a storage space of a block group is exceeded and a case where a small amount of data is updated in a block group storing the data in advance can be easily managed.

The access unit map table includes block offsets used to distinguish one or more block numbers included in the block group map table and page offsets used to distinguish a plurality of pages in a block corresponding to the block numbers. In FIG. 4, it is assumed that blocks having the block numbers 1 and 7 are allocated to the block group 7 460 and a relational expression of "block group 7->block number 1, block number 11" that represents relationships therebetween is included in the block map table. Also, when a 7-1-th access unit (referred to as access unit 7-1) exists in the block number 1 and has a page offset of 5, it can be represented as "access unit 7-1->block offset 0, page offset 5". Also, when a block offset value is 1, it indicates an 11-th block (referred to as block 11), however not the block 1. Specifically, when a relational expression is "access unit 7-1->block offset 1, page offset 5", the access unit 7-1 exists in the block number 11 and has the page offset of 5. The access unit map table includes the relational expression as described above.

The block group map table may be stored in a portion of the entire block groups, and the access unit map table may be stored in a spare area existing in an access unit in the block group.

Figure 5:
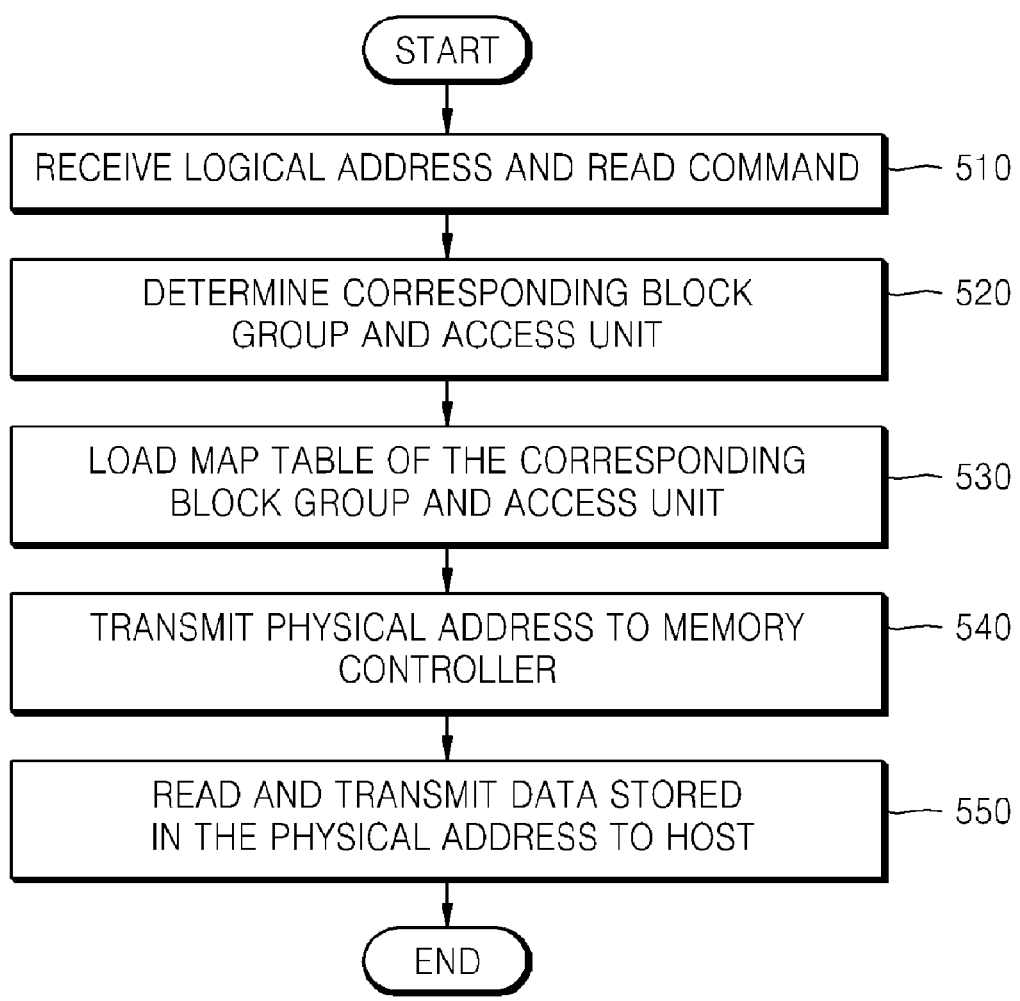
FIG. 5 is a flowchart for explaining operations of executing a read command by using an address mapping method, according to another exemplary embodiment of the present invention.

FIG. 5 is a flowchart for explaining operations of executing a read command by using an address mapping method, according to another embodiment of the present invention.

Referring to FIG. 5, a logical address and a read command are received from a host device (operation 510). A block group and an access unit corresponding to the received logical address are determined (operation 520). To do this, first, the block group map table and the access unit map table are loaded (operation 530), and the block group and the access unit mapped on the tables are retrieved. If corresponding map tables are loaded on a system memory in advance, the corresponding map tables may be directly used.

After a mapped physical address is retrieved from the block group map table and the access unit map table, the physical address is transmitted to the memory controller (operation 540).

The memory controller, which is a processor for controlling data input/output, reads data stored in the corresponding physical address and transmits the data to the host device requesting data to be read (operation 550).

Figure 6:
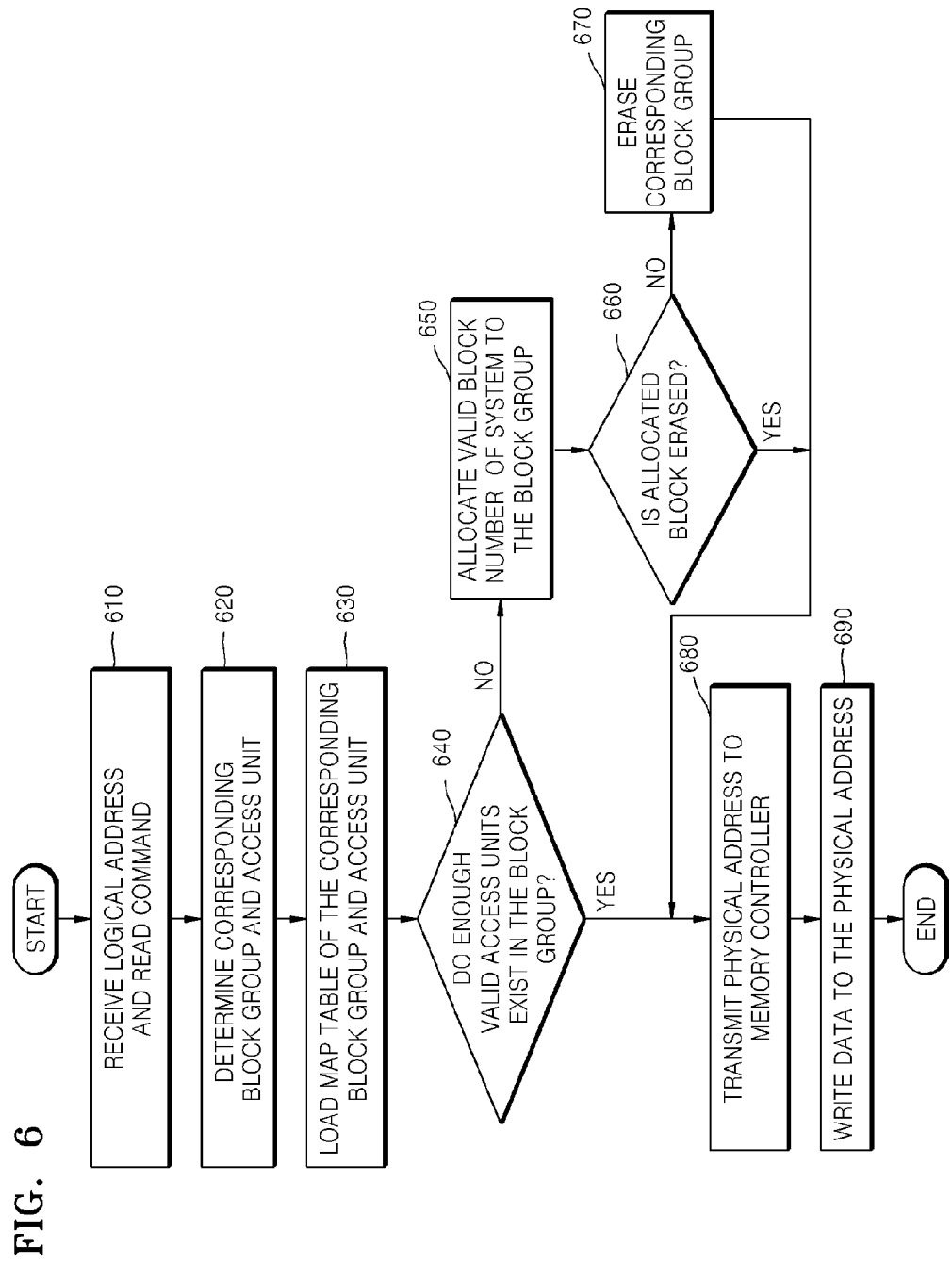
FIG. 6 is a flowchart for explaining operations of executing a write command by using an address mapping method, according to another exemplary embodiment of the present invention.

FIG. 6 is a flowchart for explaining operations of executing a write command by using an address mapping method, according to another embodiment of the present invention.

Referring to FIG. 6, as illustrated in FIG. 5, a logical address and a read command are received from a host device (operation 610). A block group and an access unit corresponding to the received logical address are determined (operation 620). To do this, first, the block group map table and the access unit map table are loaded (operation 630), and the block group and the access unit mapped on the tables are retrieved. Similarly, if corresponding map tables are loaded on the system memory in advance, the corresponding map tables may be directly used.

Then, it is determined whether enough valid access units exist in the corresponding block group in order to write data (operation 640).

If a storage space for writing the data is deficient, another valid block number of the system is additionally allocated to the block group (operation 650). As described above, the two or more block numbers can be included in a single block group.

Then, it is determined whether or not blocks corresponding to the allocated block number are erased in advance (operation 660), and if the blocks are not erased, an erasing operation is performed in units of a corresponding block group. This is because the erasing operation has to be performed before data is written, according to characteristics of the flash memory.

Then, the physical address mapped in the block group map table and the access unit map table is transmitted to the memory controller (operation 680), and the memory controller writes requested data to the corresponding physical address (operation 690).

Figure 7:
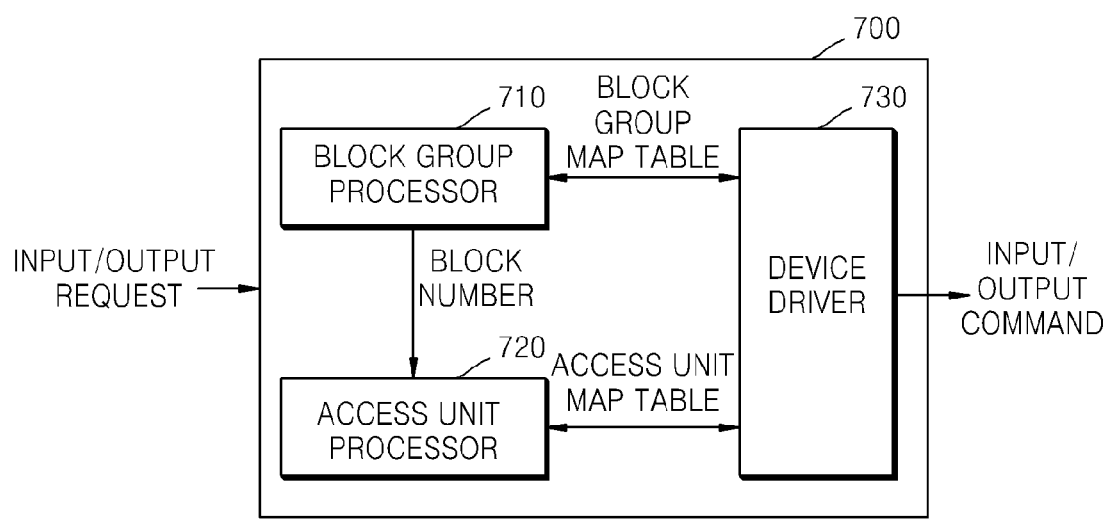
FIG. 7 is a function block diagram illustrating an apparatus for performing address mapping in a virtual file system of a storage unit having a plurality of non-volatile data storage media, according to another exemplary embodiment of the present invention.

FIG. 7 is a function block diagram illustrating an apparatus for performing address mapping in a virtual file system of a storage unit having a plurality of non-volatile data storage media, according to another embodiment of the present invention.

Referring to FIG. 7, the apparatus for performing the address mapping in the virtual file system of the storage unit having a plurality of the non-volatile data storage media includes: a block group processor 710 for determining a block group including a block included in each of a plurality of the non-volatile data storage media; an access unit processor 720 for determining an access unit including each page included in the determined block group; and a device driver 730 for transmitting a data input/output command to the block group and the access unit.

The block group processor 710 may include a first map table storage (not shown) for storing the block group map table representing relationships between the block group and a plurality of blocks included in the block group, and the access unit processor 720 may include a second map table storage (not shown) for storing the access unit map table representing relationships between the access unit and a plurality of pages included in the access unit.

The block group processor 710 may transmit the block number to the access unit processor 720, and the access unit processor 720 retrieves a corresponding access unit including a plurality of pages on the basis of the corresponding block number.

Figure 8:
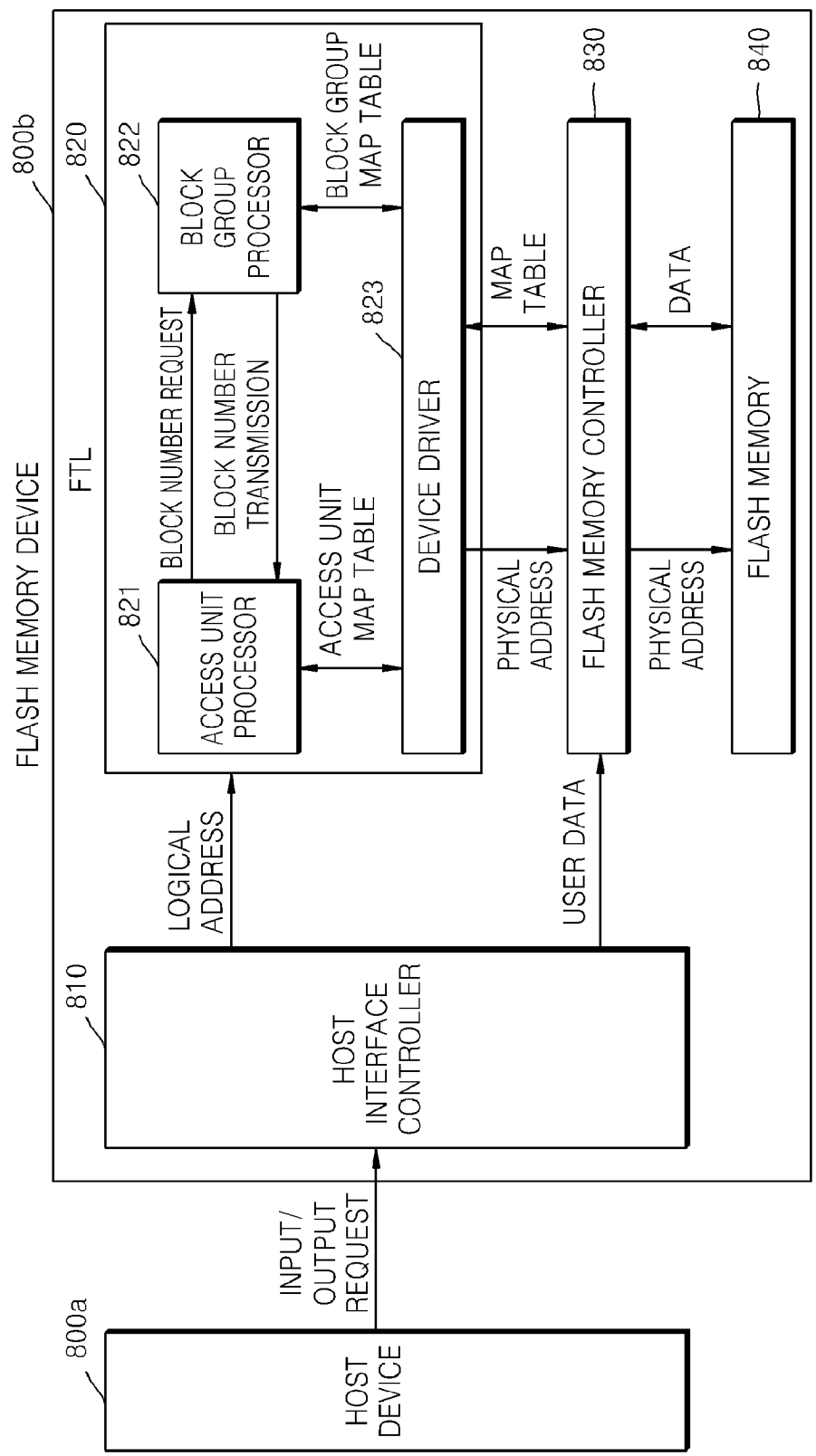
FIG. 8 is a function block diagram illustrating a flash memory device in which an address mapping apparatus is implemented, according to another exemplary embodiment of the present invention.

FIG. 8 is a function block diagram illustrating a flash memory device 800*b* in which an address mapping apparatus is implemented, according to another embodiment of the present invention.

Referring to FIG. 8, when a host device 800*a* first transmits a data input/output request to a host interface controller 810, the host interface controller 810, included in the flash memory device 800*b*, transmits a logical address in units of a 512-byte sector to an FTL 820 and transmits practical user data to a flash memory controller 830.

In the FTL 820, in order to perform address mapping, as illustrated in FIG. 7, an access unit processor 821 receives the block number from a block group processor 822, and a device driver 823 transmits an input/output command along with the translated physical address to the flash memory controller 830. The flash memory controller 830 commands a flash memory 840 to input/output data, with the user data transmitted from the host interface controller 810.

Accordingly, in the address mapping method and apparatus, an I/O throughput increases in a burst data high-speed transmission. Specifically, an address mapping processing time of the FTL that may function as a bottle-neck in high-speed input/output in the large-capacity storage unit using a plurality of the flash memory chips can be significantly reduced.

In addition, as the map table processed by the FTL in the flash memory storage unit is changed to the units of the block group and the access unit, the number of entries can be decreased as compared with the existing map table in units of blocks and pages, so that memory usage can be reduced. Therefore, the number of write/update operations performed on the map table can be reduced.

In addition, a plurality of the flash memories are connected by the block group and the access unit so as to simultaneously receive the same command, so that an accurate interleaving technique can be implemented by using a plurality of the flash memory chips.

Embodiments of the present invention can be written as computer programs and can be implemented in general-use digital computers that execute the programs using a computer readable recording medium or other computer readable media.

A data structure used in the present invention can be recorded in the computer readable recording medium through various means.

Examples of the computer readable recording medium include magnetic storage media (e.g., ROM, floppy disks, hard disks, etc.), optical and recording media (e.g., CD-ROMs, or DVDs). An example of other computer readable media is carrier waves (e.g., transmission through the Internet).

While the present invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An address mapping method performed in a virtual file system of a storage unit having a plurality of non-volatile data storage media, the method comprising:

determining a block group including at least two blocks included in each of the plurality of non-volatile data storage media;

determining an access unit including each page included in the determined block group; and mapping an address of input/output data to the determined block group and access unit, wherein the block group includes a plurality of blocks having the same block number from among a plurality of blocks included in each of the plurality of non-volatile data storage media, wherein a relationship between the block group and each block within the block group is defined by a relational expression in a block group map table, the relational expression comprising a first field that identifies a block group number and a plurality of second fields which collectively identify each block within the block group, the plurality of second fields identifying respective blocks in a set of blocks in the block group that are in same relative position in each of the plurality of non-volatile data storage media, and wherein a total number of the plurality of second fields in the block group is less than a total number of blocks within the block group.

2. The method of claim 1,
wherein the access unit includes a plurality of pages having the same offset in the block group.

3. The method of claim 2, wherein determining the block group comprises storing the block group map table representing relationships between the block group and the plurality of blocks included in the block group.

4. The method of claim 3, wherein determining the access unit comprises storing an access unit map table representing relationships between the access unit and the plurality of pages included in the access unit.

5. The method of claim 4, wherein the access unit map table includes block offsets used to distinguish the block numbers included in the block group map table and page offsets used to distinguish a plurality of the pages in the block corresponding to the block number.

6. The method of claim 5,
wherein in storing the block group map table, a predetermined block group from among the block groups is selected to store the block group map table in a corresponding block group, and
wherein in storing the access unit map table, the access unit map table is stored in a spare area existing in the access unit in the block group.

7. The method of claim 6,
wherein the block group is a unit for erasing the input/output data and a unit for simultaneously transmitting an erase command to a plurality of the blocks from the virtual file system, and
wherein the access unit is a unit for reading/writing the data and a unit for simultaneously transmitting the read/write command to a plurality of the pages.

8. The method of claim 7,
wherein the plurality of the non-volatile data storage media are a plurality of flash memories, and
wherein the virtual file system is a flash translation layer.

9. The method of claim 1, wherein the at least two blocks are not sequential in same non-volatile data storage, media are distinguished from each other using same block offset.

10. The method of claim 9, wherein the at least two blocks in same first non-volatile data storage media comprise at least one block that is not adjacent to the remaining block of the at least two blocks and wherein location of the at least two blocks in other non-volatile data storage media is same as location of the at least two blocks in the first non-volatile data storage media.

11. The method of claim 1, wherein in the block group map table, the at least two blocks in same first non-volatile data storage media are distinguished from one another using offset and said offset is same for the at least two blocks in each of remaining data storage media.

12. An address mapping apparatus in a virtual file system of a storage unit having a plurality of non-volatile data storage media, the apparatus comprising:

a block group processor which determines a block group including at least two blocks included in each of the plurality of the non-volatile data storage media;

an access unit processor which determines an access unit including each page included in the determined block group; and a device driver which transmits a data input/output command to the determined block group and access unit, wherein the block group includes a plurality of blocks having the same block number from among a plurality of blocks included in each of the non-volatile data storage media, and wherein a relationship between the block group and each block within the block group is defined by a relational expression in a block group map table, the relational expression comprising a first a field that identifies a block group number and a plurality of second fields which collectively identify each block within the block group, the plurality of second fields identifying respective blocks in a set of blocks in the group that are in same relative position in each of the plurality of non-volatile data storage media, and wherein a total number of the plurality of second fields in the block group is less than a total number of blocks within the block group, and wherein at least one of the block group processor and the access unit processor comprises a hardware component.

13. The apparatus of claim 12,
wherein the access unit includes a plurality of pages having the same offset in the block group.

14. The apparatus of claim 13, wherein the block group processor comprises a first map table storage storing the block group map table representing relationships between the block group and the plurality of blocks included in the block group.

15. The apparatus of claim 14, wherein the access unit processor comprises a second map table storage which stores an access unit map table representing relationships between the access unit and the plurality of pages included in the access unit.

16. The apparatus of claim 15, wherein the access unit map table includes block offsets used to distinguish the block numbers included in the block group map table and page offsets used to distinguish a plurality of the pages in the block corresponding to the block number.

17. The apparatus of claim 16,
wherein the first map table storage included in the block group processor selects a predetermined block group from among the block groups to store the block group map table in a corresponding block group, and
wherein the second map table storage included in the access unit processor stores the access unit map table in a spare area existing in the access unit in the block group.

18. The apparatus of claim 17,
wherein the block group is a unit for erasing the input/output data and a unit for simultaneously transmitting an erase command to the blocks from the virtual file system, and
wherein the access unit is a unit for reading/writing the data and a unit for simultaneously transmitting the read/write command to the pages.

19. The apparatus of claim 18,
wherein the plurality of non-volatile data storage media are a plurality of flash memories, and
wherein the virtual file system is a flash translation layer.

20. A non-transitory computer-readable medium having embodied thereon a computer program for performing the method of claim 1.

21. A memory device having the apparatus of claim 12.

* * * * *